(12) United States Patent
Kim

(10) Patent No.: US 8,303,156 B2
(45) Date of Patent: Nov. 6, 2012

(54) LIGHT SOURCE UNIT, LIGHT EMITTING DEVICE, AND DISPLAY DEVICE HAVING SAME

(75) Inventor: Ju-Hyoun Kim, Suwon-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 206 days.

(21) Appl. No.: 12/845,464

(22) Filed: Jul. 28, 2010

(65) Prior Publication Data

US 2010/0309686 A1    Dec. 9, 2010

Related U.S. Application Data

(63) Continuation of application No. 11/949,901, filed on Dec. 4, 2007, now Pat. No. 7,784,990.

(30) Foreign Application Priority Data

Dec. 5, 2006  (KR) .......................... 10-2006-0122001

(51) Int. Cl.
F21V 7/04 (2006.01)

(52) U.S. Cl. ................................. 362/631; 362/249.02

(58) Field of Classification Search .................. 362/612, 362/613, 630, 631, 632, 633, 634, 646, 249.02
See application file for complete search history.

(56) References Cited

U.S. PATENT DOCUMENTS

| | | | |
|---|---|---|---|
| 5,337,225 A | 8/1994 | Brookman | |
| 6,866,394 B1 | 3/2005 | Hutchins et al. | |
| 7,083,317 B2 | 8/2006 | Higashiyama | |
| 7,325,941 B2 | 2/2008 | Kim et al. | |
| 7,461,951 B2 | 12/2008 | Chou et al. | |
| 7,784,990 B2 * | 8/2010 | Kim ............................. | 362/631 |
| 2006/0066770 A1 | 3/2006 | Hayano et al. | |
| 2007/0201247 A1 | 8/2007 | Ohno et al. | |
| 2008/0074408 A1 | 3/2008 | Jang | |

FOREIGN PATENT DOCUMENTS

| | | |
|---|---|---|
| CN | 1512242 | 7/2004 |
| JP | 07-015045 | 1/1995 |
| JP | 2002-163915 | 6/2002 |
| JP | 2003-084278 | 3/2003 |
| JP | 2003-215546 | 7/2003 |
| JP | 2003-279973 | 10/2003 |
| JP | 2004-235139 | 8/2004 |
| JP | 2004-241282 | 8/2004 |
| JP | 2005-077757 | 3/2005 |
| JP | 2005-078832 | 3/2005 |
| JP | 2005-123103 | 5/2005 |
| JP | 2005-321586 | 11/2005 |
| JP | 2005-326454 | 11/2005 |

(Continued)

*Primary Examiner* — David V Bruce
(74) *Attorney, Agent, or Firm* — F. Chau & Associates, LLC

(57) ABSTRACT

A light emitting device includes at least one light source, a rigid nonconductive light source fixing member having at least one fastening unit that includes a plurality of sections defining spaces where the at least one light source is fixed, a wiring line, which transmits a driving signal to the at least one light source, wherein the wiring line is formed in the light source fixing member such that the wiring line is not directly exposed on the outer surface of the light source fixing member, and an optical waveguide that guides light emitted from the at least one light source.

19 Claims, 6 Drawing Sheets

FOREIGN PATENT DOCUMENTS

| | | |
|---|---|---|
| JP | 2006-054140 | 2/2006 |
| JP | 2006-114854 | 4/2006 |
| JP | 2006-210183 | 8/2006 |
| JP | 2006-278205 | 10/2006 |
| KR | 1020010111520 A | 12/2001 |
| KR | 1020050005353 A | 1/2005 |
| KR | 1020050060479 A | 6/2005 |
| KR | 1020060042777 A | 5/2006 |
| KR | 1020060054742 A | 5/2006 |
| KR | 1020060071553 A | 6/2006 |

* cited by examiner

LIGHT SOURCE UNIT, LIGHT EMITTING DEVICE, AND DISPLAY DEVICE HAVING SAME

CROSS-REFERENCE TO RELATED PATENT APPLICATION

This application is a Continuation of U.S. application Ser. No. 11/949,901 filed on Dec. 4, 2007, now U.S. Pat. No. 7,784,990 which claims priority to Korean Patent Application No. 10-2006-0122001, filed on Dec. 5, 2006, the disclosures of which are incorporated by reference herein in their entireties.

BACKGROUND OF THE INVENTION

1. Technical Field

The present disclosure relates to a light emitting device and a display device having the same.

2. Discussion of Related Art

Various kinds of electronic devices such as mobile devices, monitors and television sets include a display device to display an image. A flat panel display device is commonly used for the display device. For example, a liquid crystal display (LCD) is a type of flat panel display device that is widely used.

LCD devices have become increasingly popular in a wide variety of applications due to their thin profile, low driving voltage and low power consumption. Cathode ray tube (CRT) devices, which are large-sized, heavy weight and require high driving voltages, are being replaced by LCD devices. For example, liquid crystal displays are being used for medium-sized and large-sized monitors and TV panels, as well as small- or pocket-sized devices, such as a cellular phone, a personal digital assistant (PDA), and a portable multimedia player (PMP).

A liquid crystal display is not a self-luminous device, but controls the transmission or reflection of light received from a light source to display images. A light source unit for an LCD device may be formed by fixing a light source to a flexible printed circuit board. The flexible printed circuit board may be attached to a mold frame by an adhesive tape. However, in a conventional light source unit, the printed circuit board may become detached from the mold frame. For example, movement of the printed circuit board may cause the tape to detach and allow the board to deviate from its original position. In such case, light emitted from the light source may fail to be supplied to an optical waveguide and may leak, which can affect the overall luminance. In conventional light source units, a short circuit may occur due to contact of the light source with a peripheral component.

SUMMARY OF THE INVENTION

In an exemplary embodiment of the present invention, a light emitting device includes at least one light source, a rigid nonconductive light source fixing member having at least one fastening unit that includes a plurality of sections defining spaces where the at least one light source is fixed, and extending in a first direction, a wiring line, which transmits a driving signal to the at least one light source, wherein the wiring line is formed in the light source fixing member such that the wiring line is not directly exposed on the outer surface of the light source fixing member, and an optical waveguide that guides light emitted from the at least one light source.

The wiring line may extend in the first direction. The wiring line may be formed in the light source fixing member. The light source fixing member may include a terminal unit that connects the wiring line to an external power supply, and the terminal unit may be exposed to the outside. The at least one light source may be provided as a plurality of light sources, and the terminal unit may be adjacent to a leftmost or rightmost light source of the plurality of light sources.

In an exemplary embodiment of the present invention, a light emitting device includes a fixing member fixing the light source fixing member and the optical waveguide. The fixing member may have an opening and the terminal unit may be exposed to the outside through the opening.

The plurality of light sources and the terminal unit may be arranged in a line. The opening of the fixing member may be formed proximate a corner of the fixing member. The light source fixing member may include a printed circuit board having the patterned wiring line thereon. The printed circuit board may be flexible.

A light emitting device according to an exemplary embodiment of the present invention may include a nonconductive fixing member that fixes the light source fixing member and the optical waveguide. The light source fixing member and the fixing member may be integrally formed. The light source fixing member may be coupled to the fixing member in a sliding manner.

The at least one light source may be provided as a plurality of light sources. The light source fixing member may include a light source fixing portion that fixes the plurality of light sources to be spaced apart from each other at predetermined intervals and extending in the first direction, and the fastening unit connected to both sides of the light source fixing portion. The fastening units may be formed to have steps with the light source, and the thickness of the fastening units may be smaller than the thickness of the light source fixing portion. Grooves may be formed in the inner surface of the fixing member and the fastening units may be fit into the grooves. A groove may be formed in each of the containing sections and the plurality of light sources may each be respectively fixed in the grooves. The side surface of each of the containing sections may include a reflective film. The light source fixing portion may include a plurality of partitions isolating each of the plurality of light sources. The thickness of the light source fixing portion may be within a range of about 0.3 mm to about 0.7 mm.

The fixing member may have an opening, and the light source fixing member may be disposed in the opening and fixed to the fixing member. The difference between the length of the light source fixing member and the width of the opening in the same direction as the longitudinal direction of the light source fixing member is equal to or less than about 0.2 mm. Each of the at least one light source may be a light emitting diode.

In an exemplary embodiment of the present invention, a display device includes a display panel and a light emitting device that supplies light to the display panel. The light emitting device includes at least one light source, a rigid nonconductive light source fixing member having at least one fastening unit and including a plurality of sections defining spaces where the at least one light source is fixed, and extending in a first direction, a wiring line, which transmits a driving signal to the at least one light source, wherein the wiring line is formed in the light source fixing member such that the wiring line is not directly exposed on the outer surface of the light source fixing member, and an optical waveguide that guides light emitted from the at least one light source.

The wiring line may extend in the first direction. The light source fixing member may include a terminal unit that connects the wiring line to an external power supply, and the terminal unit may be exposed to the outside. The at least one light source may be provided as a plurality of light sources, and the plurality of light sources and the terminal unit may be arranged in a line. The light source fixing member may include a printed circuit board having the patterned wiring line thereon.

In an exemplary embodiment of the present invention, a light emitting device may include a fixing member fixing the light source fixing member and the optical waveguide. The light source fixing member and the fixing member may be integrally formed. The at least one light source may be provided as a plurality of light sources. The light source fixing member may include a light source fixing portion that fixes the plurality of light sources to be spaced apart from each other at predetermined intervals and extending in the first direction, and fastening units connected to both sides of the light source fixing portion. A groove may be formed in each of the containing sections and the plurality of light sources may each be fixed in the grooves.

The display panel may be a liquid crystal panel. The display panel may be used for a portable device.

In an exemplary embodiment of the present invention, a light source unit includes a rigid nonconductive light source fixing member having at least one fastening unit and including a plurality of sections defining spaces where the at least one light source is fixed, and extending in a first direction, and a wiring line, which transmits a driving signal to the at least one light source, wherein the wiring line is formed in the light source fixing member such that the wiring line is not directly exposed on the outer surface of the light source fixing member.

The light source fixing member may include a terminal unit that connects the wiring line to an external power supply, and the terminal unit may be exposed to the outside. The light source unit may include one or more light emitting diodes each serving as the light source.

BRIEF DESCRIPTION OF THE DRAWINGS

The present invention will become readily apparent to those of ordinary skill in the art when descriptions of exemplary embodiments thereof are read with reference to the accompanying drawings.

DESCRIPTION OF EXEMPLARY EMBODIMENTS

Figure 1:
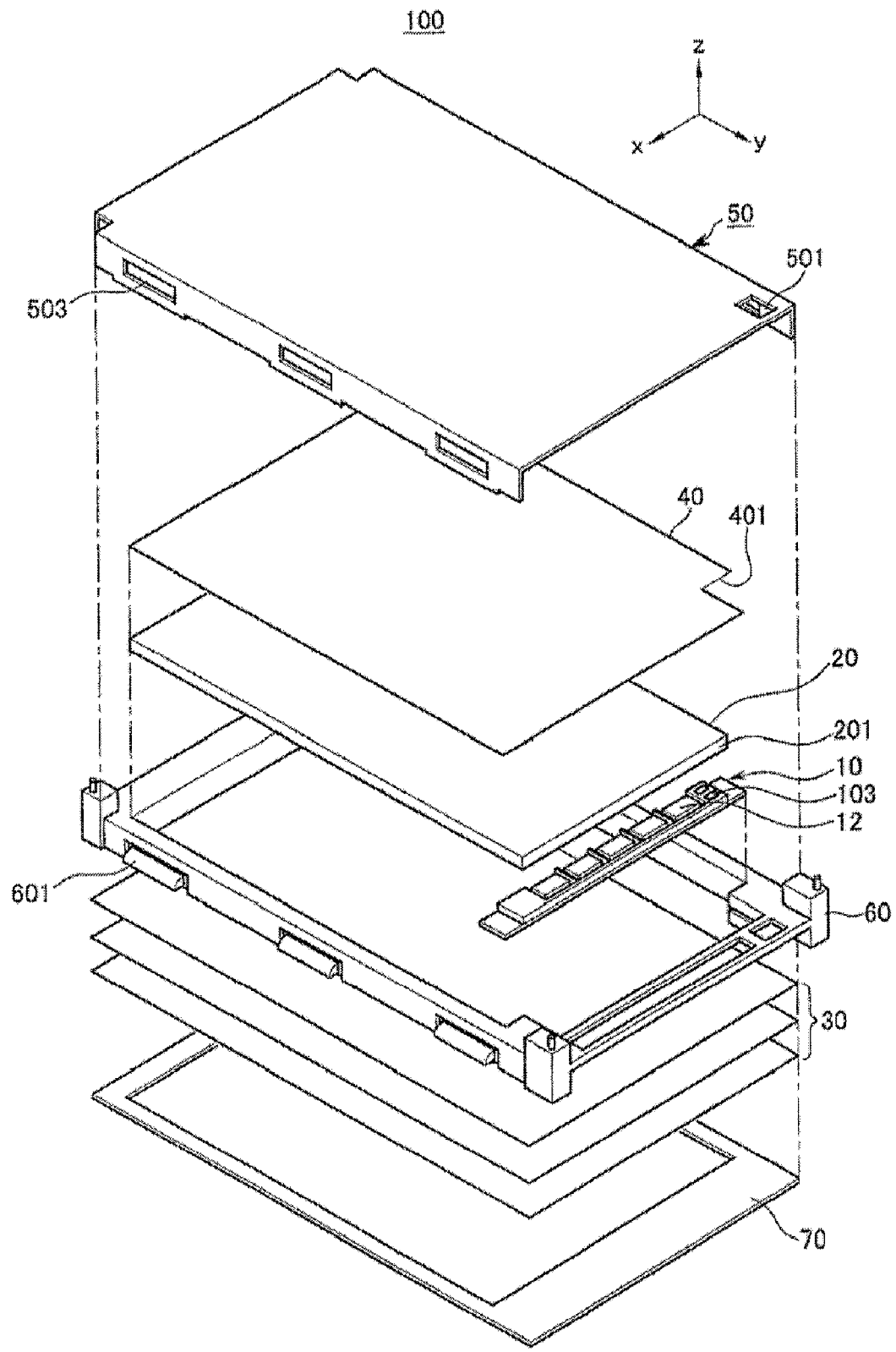
FIG. 1 is an exploded perspective view schematically illustrating a light emitting device according to an exemplary embodiment of the present invention.

Hereinafter, exemplary embodiments of the present invention will be described in detail with reference to the accompanying drawings. Like reference numerals may designate the same or similar elements throughout the description of the figures.

FIG. 1 is an exploded perspective view schematically illustrating a light emitting device 100 according to an exemplary embodiment of the present invention. The light emitting device 100 includes at least one light source 12. For convenience, in FIG. 1, the light emitting device 100 is shown face down, and light emitted from the light source 12 will be described as propagating downward or in a negative z-axis direction.

Figure 6:
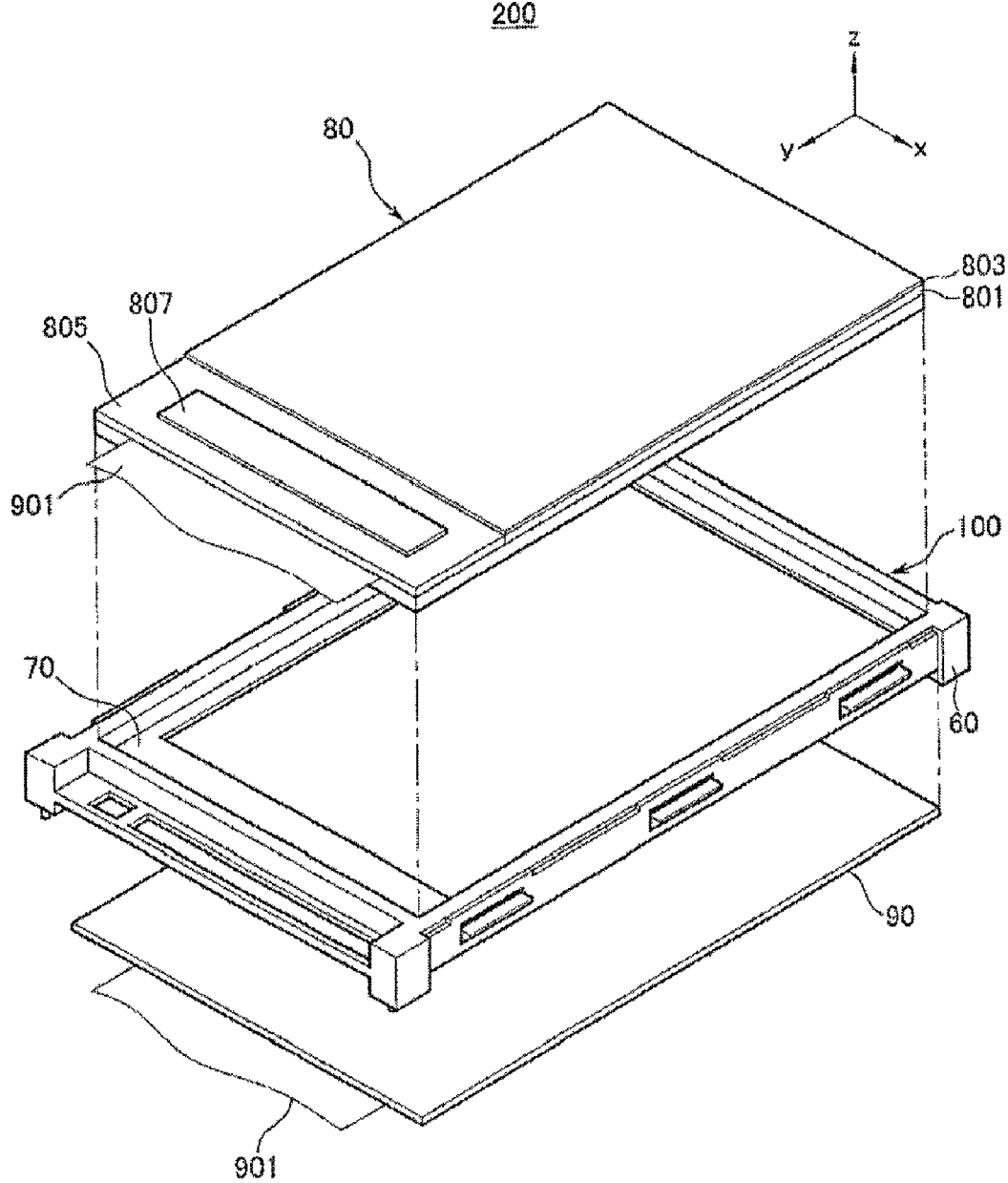
FIG. 6 is an exploded perspective view schematically illustrating a display device having a light emitting device according to an exemplary embodiment of the present invention.

The light emitting device 100 includes at least one light source 12, a light source fixing member 10, and an optical waveguide 20. A light source unit includes the light source fixing member 10 and a wiring line 105 (see FIG. 4A). The light source unit may include a plurality of light sources 12. As shown in FIG. 1, the light emitting device 100 includes a plurality of optical sheets 30 and a reflective sheet 40 to effectively use light emitted from the light source 12. The light emitting device 100 includes a first fixing member 50 and a second fixing member 60 for fixing components. An adhesive sheet 70 may be used to attach a display panel 80, as shown in FIG. 6.

In FIG. 1, five light sources 12 are shown. However, it is to be understood that various numbers of light sources 12 may be used. A structure having at least one light source may be used. For example, a light emitting diode (LED) may be used as the light source 12. It is easy to reduce the size of a light emitting diode, which makes light emitting diodes suitable for portable applications, such as cellular phones and PMPs. The light sources 12 are provided on the light source fixing member 10, and are connected to an external power supply through a terminal unit 103. The light source fixing member 10 extends in an x-axis direction. The light source fixing member 10 having a predetermined thickness may comprise a nonconductive material, such as for example, a resin.

In the exemplary embodiment of the present invention, the light source fixing member 10 extends in one direction, for example, in an x-axis direction as shown in FIG. 1, and when both ends of the light source fixing member 10 are fixed, the light source fixing member 10 is stabilized, and the use of adhesive tape to attach the light source fixing member is not required. Since the light source fixing member 10 is not movable, a gap through which light emitted from the light source 12 leaks can be prevented, and luminance can be improved. In the exemplary embodiment of the present invention, the light source fixing member 10 is composed of a rigid nonconductive material, which negates the possibility that a short circuit will occur due to contact of the light source with a peripheral component. The light source fixing member 10 may have a predetermined thickness, such that the light source fixing member 10 cannot be easily bent and withstands external impact, which may firmly fix the light source 12 and minimize damage due to external impact.

Figure 4A:
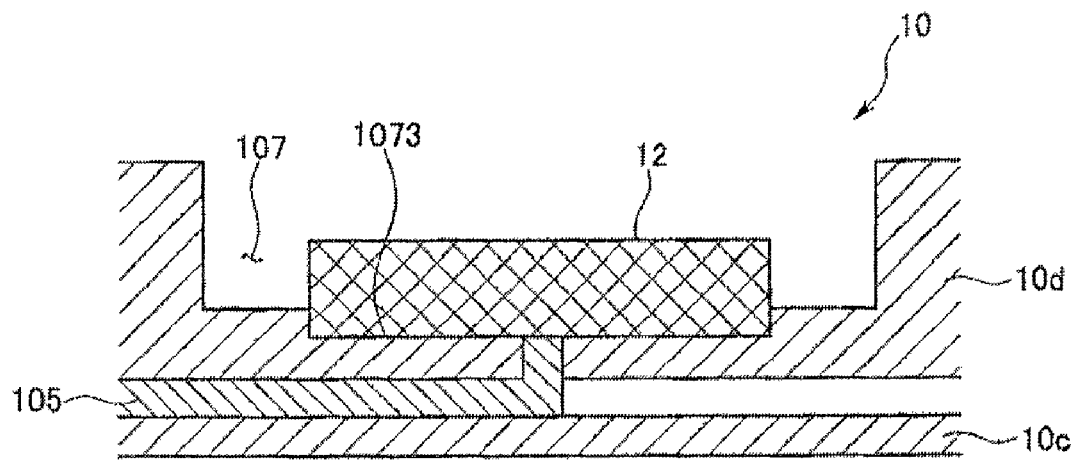
FIG. 4A is a cross-sectional view schematically illustrating the light source fixing member taken along the line IV-IV of FIG. 3.

The wiring line 105 shown in FIG. 4A that is connected to the light sources 12 is formed in the light source fixing member 10. Because the wiring line 105 is not directly exposed on an outer surface of the light source fixing member 10, the wiring line 105 may not come into direct contact with an external component, and a potential short circuit due to contact of the wiring line 105 with an external component can be avoided. The wiring line 105 is connected to an external power supply through the terminal unit 103. Since the connected portion with the external power supply is formed by the terminal unit 103, disconnection may be prevented. Since the terminal unit 103 is exposed to the outside, it can be easily connected to the external power supply.

Light emitted from the light source 12 is incident on a side surface 201 of the optical waveguide 20. The light introduced into the optical waveguide 20 is diffused and guided in the optical waveguide 20 so as to be emitted toward the optical sheets 30. The reflective sheet 40, which is attached to the optical waveguide 20, reflects light so as to minimize light loss. The reflective sheet 40 may be formed of a light reflecting material, such as for example, aluminum. The optical waveguide 20 may be formed of, for example, polymethyl methacrylate (PMMA). A plurality of patterns is formed on a surface of the optical waveguide 20 to diffuse light throughout substantially the entire surface of the optical waveguide 20. The plurality of patterns has different sizes depending on their positions on the optical waveguide 20.

The plurality of optical sheets 30 make the light emitted from the optical waveguide 20 travel straight and uniformize the light, such that uniformized light having improved directivity is emitted. The optical sheets 30 may include, for example, a diffuser sheet, a prism sheet, and/or a protecting sheet. The diffuser sheet diffuses the light to uniformize the light. The prism sheet may improve the directivity of the light. The protecting sheet covers the prism sheet to protect the prisms formed in the prism sheet.

The adhesive sheet 70 fixes the plurality of optical sheets 30, the optical waveguide 20, and the light source fixing member 12. For example, when the light emitting device 100 is small-sized, a space for additional fixing members for fixing components may be insufficient, and the adhesive sheet 70 may be used. For example, a pressure sensitive adhesive (PSA) may be used as the adhesive sheet 70. An adhesive material in the PSA may be uniformly dispersed by the application of pressure to the adhesive sheet 70, whereby the PSA exhibits adhesiveness to fix the above-mentioned components to the adhesive sheet 70. When both surfaces of the adhesive sheet 70 are adhesive, the display panel 80 shown in FIG. 6 may be attached to the surface of the adhesive sheet 70 opposite to the surface to which the above-mentioned components are attached to fix the display panel 80.

The first fixing member 50 fixes the internal components of the light emitting device 100. An opening 501 is formed around a corner of the first fixing member 50, for example, at the right lower portion of the first fixing member 50. To expose the terminal unit 103 to connect with the external power supply, a corner 401 of the reflective sheet 40 is cut off and an opening 501 is formed in the first fixing member 50. A plurality of fixing grooves 503 are formed in the side surfaces of the first fixing member 50 and are coupled to a plurality of fastening units 601 of the second fixing member 60. Therefore, the internal components of the light emitting device 100 can be firmly fixed. The first fixing member 50 may comprise a metal, such as iron, magnesium, and aluminum. The first fixing member 50 may be formed in the shape shown in FIG. 1, for example, through a bending process and a punching process. The second fixing member 60 fixes the optical waveguide 20 and the light source fixing member 10. The second fixing member 60 may comprise a nonconductive material, such as a resin. For example, the second fixing member 60 may comprise a resin that is used for injection molding or the like. The second fixing member 60 and the light source fixing member 10 may be formed of the same material or different materials.

Figure 2:
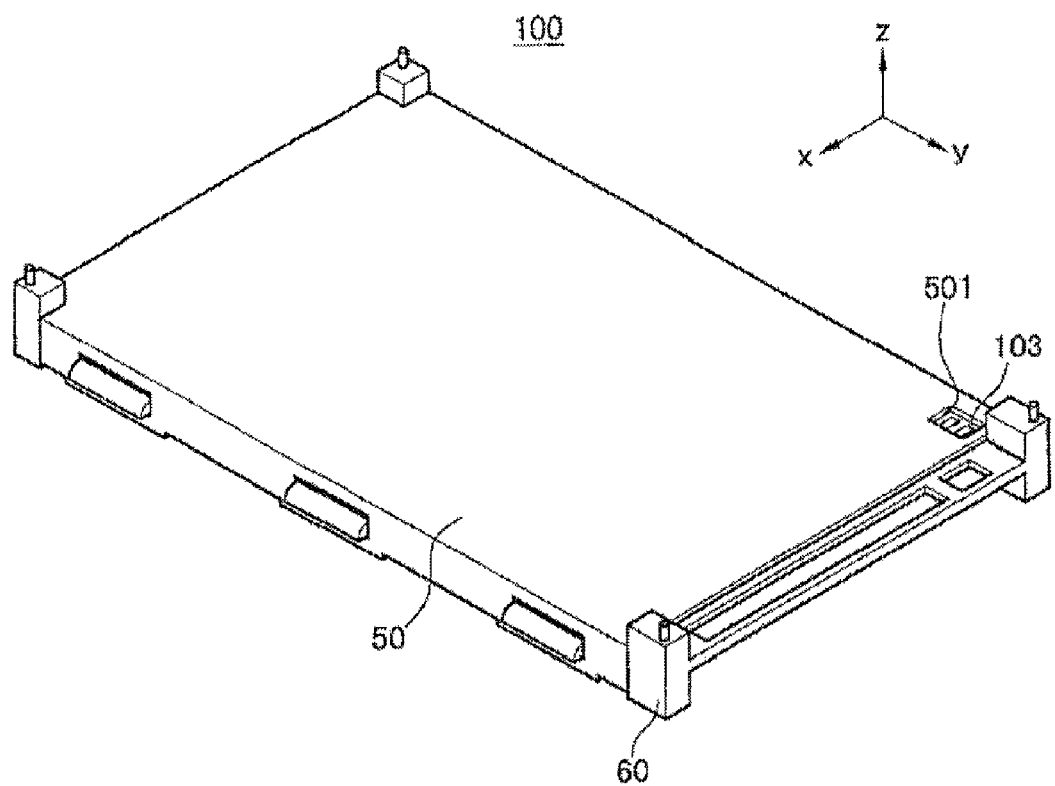
FIG. 2 is a view illustrating the assembled light emitting device of FIG. 1.

FIG. 2 is a view illustrating the assembled light emitting device 100 of FIG. 1. The first fixing member 50 and the second fixing member 60 are coupled to each other, as shown in FIG. 2.

The terminal unit 103 of the light source fixing member 10 (shown in FIG. 1) is exposed to the outside through the opening 501 of the first fixing member 50, for example, to facilitate the connection of the terminal unit 103 to an external power supply. When the external power supply is connected to the terminal unit 103, a driving voltage may be applied to the light sources 12 shown in FIG. 1.

Figure 3:
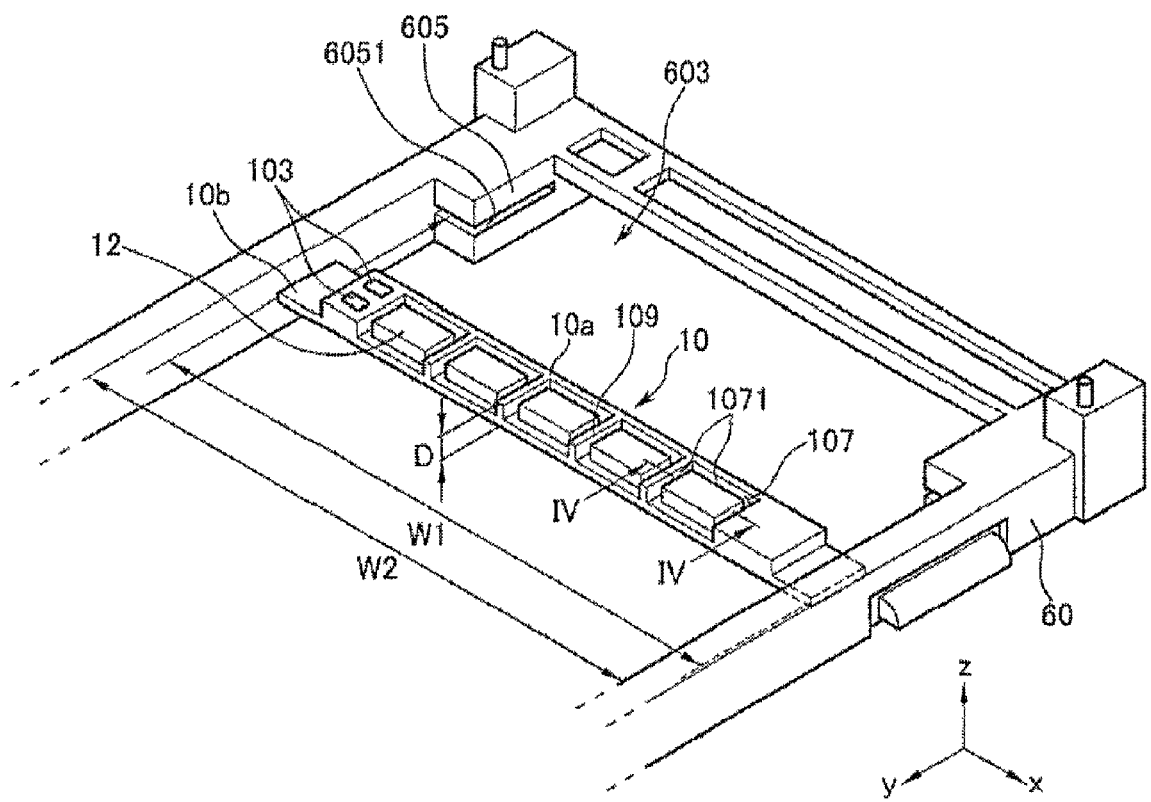
FIG. 3 is a view partially illustrating a light source fixing member and a second fixing member, according to an exemplary embodiment of the present invention.

FIG. 3 is a view partially illustrating a state in which the light source fixing member 10 is coupled to the second fixing member 60, according to an exemplary embodiment of the present invention. Hereinafter, the light source fixing member 10 will be described in detail.

The light source fixing member 10 includes a light source fixing portion 10a and a pair of fastening units 10b. The fastening units 10b are respectively connected to the sides of the light source fixing portion 10a. The light sources 12 and the wiring line 105 shown in FIG. 4A, which are connected to the light sources 12, are formed in the light source fixing member 10.

The five light sources 12 are fixed to the light source fixing portion 10a to be apart from each other, and the terminal unit 103 is provided to the light source fixing portion 10a. The five light sources 12 are arranged in a line, for example, in the x-axis direction of FIG. 3. The light source fixing portion 10a extends in one direction. The terminal unit 103 is adjacent to a light source 12 positioned proximate an edge of the light source fixing member 10, for example, at the left end of the light source fixing portion 10a. The wiring line 105 is formed in the light source fixing portion 10a. To simplify the structure of the wiring line 105, the terminal unit 103 and the light sources 12 may be arranged in a line, for example, to facilitate the electrical connection of the terminal unit 103 and the light sources 12.

The light source fixing portion 10a includes a plurality of containing sections 107 where the light sources 12 are disposed, and a plurality of partitions 109 by which the light sources 12 are isolated from each other. The containing sections 107 define spaces where the light sources 12 are fixed. In an exemplary embodiment of the present invention, even though the light sources 12 may move due to movement of the display device, the light sources 12 may not largely deviate from their original positions due to the spatial restriction defined by the containing sections 107. The containing sections 107 may maintain the arrangement of the light sources 12.

Figure 4B:
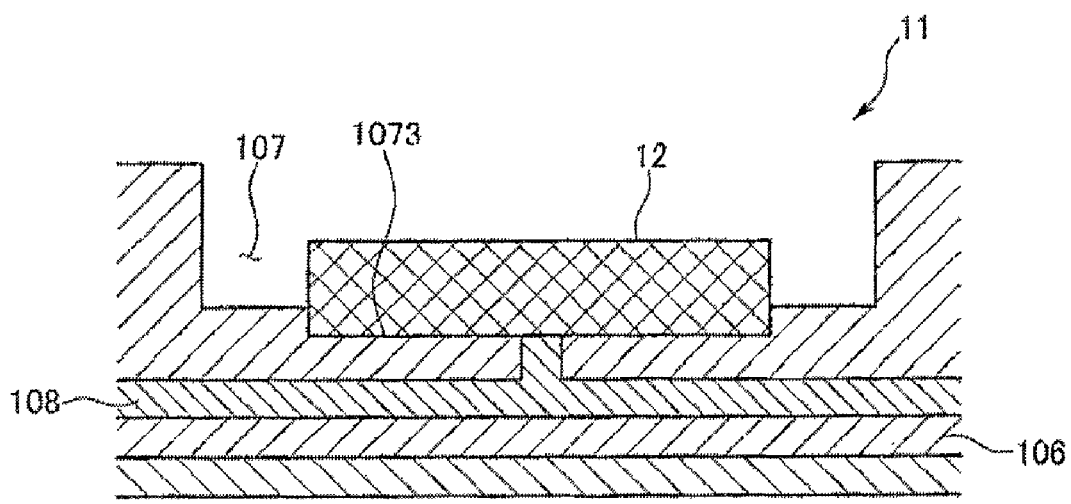
FIG. 4B is a cross-sectional view schematically illustrating a light source fixing member according to an exemplary embodiment of the present invention.

Grooves 1073 shown in FIGS. 4A and 4B, which are formed in the containing sections 107, stably fix the light sources 12. The partitions 109 allow the light sources 12 to be spaced apart from each other at predetermined intervals. A reflective film 1071, which is formed on the side surfaces of each of the containing sections 107, reflects the light emitted from the light sources 12, and light loss may be minimized.

The thickness D of the light source fixing portion 10a may be within a range of about 0.3 mm to about 0.7 mm. As used herein, the thickness of the light source fixing portion 10a refers to the height of a portion including a partition 109. When the thickness D of the light source fixing portion 10a is adjusted to be within a predetermined range, such as about 0.3 mm to about 0.7 mm, the strength of the light source fixing member 10 may be optimized, and even if an external impact affects the light source fixing member 10, the light sources 12 may not be damaged. If the thickness D of the light source fixing portion 10a is too small, the light sources may be damaged by an external impact. On the other hand, if the thickness D of the light source fixing portion 10a is too large, the light source fixing portion 10a is not compatible with the other components nor is it suitable for a small-sized light emitting device.

The fastening units 10b are formed to have steps with respect to the light source fixing portion 10a. For example, the thicknesses of the fastening units 10b are smaller than the thickness of the light source fixing portion 10a. When the thicknesses of the fastening units 10b are set to be relatively small, the fastening units 10b may be coupled with the second fixing member 60 in a sliding manner. When the light source fixing member 10 is coupled with the second fixing member 60 in the sliding manner, the light source fixing member may be easily attached or detached.

A plurality of grooves 6051 are formed in the inner surface 605 of the second fixing member 60. As indicated by an arrow in FIG. 3, the left fastening unit 10b moves and is fitted into the grooves 6051, such that the light source fixing member 10 is coupled with the second fixing member 60. The right side of the light source fixing member 10 can be coupled with the second fixing member 60 in the same manner as the left side. When both sides of the light source fixing member 10 are coupled with the second fixing member 60, the light source fixing member 10 may be firmly fixed in place.

To couple the light source fixing member 10 to the second fixing member 60, a tolerance between the light source fixing member 10 and the second fixing member 60 may be adjusted. For example, the length W1 of the light source fixing member 10 and the width W2 in the x-axis direction of an opening 603 formed in the second fixing member 60 may be adjusted so as to facilitate the coupling of the light source fixing member 10 to the second fixing member 60. In an exemplary embodiment of the present invention, the widthwise direction of the opening 603 is parallel with the longitudinal direction of the light source fixing member 10, which may be extended in the x-axis direction. The difference between the width W2 of the opening 603 and the length W1 of the light source fixing member 10 may be adjusted to be equal to or less than about 0.2 mm. When the difference between the width W2 and the length W1 is large, the tolerance becomes large, which may make it difficult to couple the light source fixing member 10 with the second fixing member 60.

FIG. 4A is a cross-sectional view schematically illustrating the light source fixing member 10 taken along the line IV-IV of FIG. 3.

As shown in FIG. 4A, since the grooves 1073 are formed in the containing sections 107 to stably fix the light sources 12 into the grooves 1073, the light sources 12 may not be easily deviated from their original positions and it may be simple to arrange the light sources 12.

The light source fixing member 10 includes the wiring line 105 formed therein. The wiring line 105, which is connected to the light sources 12, transmits the driving signal to the light sources 12. Hereinafter, a method of fabricating the light source fixing member 10 shown in FIG. 4A, according to an exemplary embodiment of the present invention, will be described. A lower portion 10c of the light source fixing member 10 is first formed by injection molding. Next, the wiring line 105 is disposed on the lower portion 10c. An upper portion 10d of the light source fixing member 10, which may be formed by injection molding, is mounted on the wiring line 105 so as to expose the terminal unit 103 (shown in FIG. 3). Finally, the upper portion 10d and the lower portion 10c are bonded to each other, for example, at high temperature.

FIG. 4B is a cross-sectional view schematically illustrating the light source fixing member 11. The light source fixing member 11 shown in FIG. 4B is similar to the light source fixing member 10 of FIG. 4A. Elements of the light source fixing member 11 that are the same as or similar to those of the light source fixing member 10 are denoted by the same reference numerals and further descriptions thereof will be omitted.

As shown in FIG. 4B, a wiring line 108 may be patterned on a flexible printed circuit board 106 and the size of the wiring line 108 may be reduced, which may facilitate the fabrication of the light source fixing member 11. When the flexible printed circuit board 106 is used, the thickness of the flexible printed circuit board 106 can be reduced, which may facilitate the fabrication of the light source fixing member 11.

The wiring line 108 shown in FIG. 4B may be patterned by etching the printed circuit board 106. The wiring line 108 may be inserted into the light source fixing member 11 during the injection molding of the light source fixing member 11.

Figure 5:
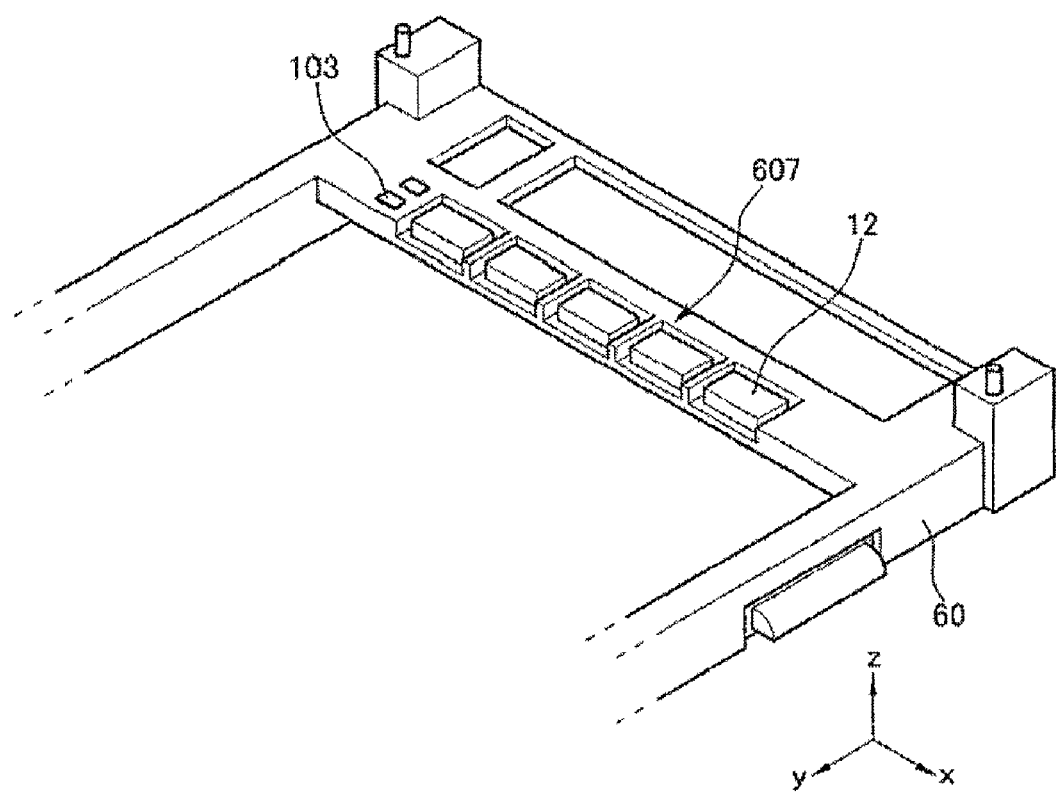
FIG. 5 is a view schematically illustrating a light source fixing member included in a light emitting device according to an exemplary embodiment of the present invention.

FIG. 5 is a view schematically illustrating a light source fixing member 607 included in a light emitting device according to an exemplary embodiment of the present invention. The light source fixing member 607 shown in FIG. 5 is similar to the light source fixing member 10 of FIG. 3. Elements of the light source fixing member 607 that are the same as or similar to those of the light source fixing member 10 are denoted by the same reference numerals and further descriptions thereof will be omitted.

As shown in FIG. 5, the light source fixing member 607 may be integrally formed with the second fixing member 60. When the light source fixing member 607 is integrally formed with the second fixing member 60, the light source fixing member 607 does not move, and leakage of the light emitted from the light sources 12 may be prevented.

FIG. 6 is an exploded view illustrating a display device 200 according to an exemplary embodiment of the present invention. The display device 200 shown in FIG. 6 includes the light emitting device 100 of FIG. 1. In FIG. 6, the display device 200 with the light emitting device 100 of FIG. 2 is positioned upside down.

The display device 200 includes the display panel 80, the light emitting device 100, and a printed circuit board 90. For example, a liquid crystal display panel may be used as the display panel 80. The display panel 80 may be pressed onto the adhesive sheet 70 so as to be coupled with the light emitting device 100. The display panel 80 is electrically connected to the printed circuit board 90 through a flexible printed circuit film (FPC film) 901. Although not shown as such in FIG. 6 the ends of the flexible printed circuit film 901 are continuous. The terminal unit 103 (shown in FIG. 1) is electrically connected to a connector (now shown) of the printed circuit board 90. Therefore, the light sources 12 (shown in FIG. 1) can receive the driving signal from the printed circuit board 90.

The display panel 80 includes a thin film transistor (TFT) panel 801, a color filter panel 803, and liquid crystal (not shown) injected between the two panels. The TFT panel 801 faces the color filter panel 803 and has a plurality of TFTs that are formed thereon in a matrix. Source terminals of the TFTs on the TFT panel 801 are connected to a plurality of data lines, and gate terminals of the TFTs are connected to a plurality of gate lines. A plurality of pixel electrodes that is formed of a conductive and transparent material, such as for example, indium tin oxide (ITO), is formed in drain terminals of the TFTs.

The data lines and the gate lines of the TFT panel 801 are electrically connected to the printed circuit board 90 such that when an electrical signal is input from the printed circuit board 90, the electrical signal is input to the source and gate terminals of the TFTs. Each of the TFTs is turned on or off based on the electrical signal, such that the electrical signal for pixel formation is output to the drain terminal of the corresponding TFT. An integrated circuit chip 807, which may be mounted on the TFT panel 801, controls the display panel 80. The integrated circuit chip 807 generates a plurality of timing signals for applying data driving signals and gate driving signals at a predetermined timing and applies the generated timing signals to the data lines and gate lines of the display panel 80. A passivation layer 805 may be applied to protect the integrated circuit chip 807.

The color filter panel 803 is disposed on the TFT panel 801. The color filter panel 803 comprises a substrate having a plurality of color pixels, for example, R, G, and B pixels, that are formed by a thin film process and transmit light such that predetermined colors are displayed. A conductive and transparent material, such as ITO, is coated on the entire surface of the color filter panel 803 to form a common electrode. When a power supply voltage is supplied to the gate and source terminals of a TFT such that the TFT is turned on, an electric field is formed between the pixel electrode and the common electrode of the color filter substrate. The electric field changes the orientation of the liquid crystal molecules of the liquid crystal layer interposed between the TFT panel 801 and the color filter panel 803 to control the light transmittance through the liquid crystal layer. Polarizers (not shown) may be attached to both surfaces of the display panel 80 to polarize light passing through the display panel 80.

Although exemplary embodiments of the present invention have been described in detail with reference to the accompanying drawings for the purpose of illustration, it is to be understood that the inventive processes and apparatus should not be construed as limited thereby. It will be apparent to those of ordinary skill in the art that various modifications to the foregoing exemplary embodiments can be made without departing from the scope of the invention as defined by the appended claims, with equivalents of the claims to be included therein.

What is claimed is:

1. A light emitting device comprising:
   at least one light source;
   a rigid, nonconductive light source fixing member having at least one fastening unit that includes a plurality of sections defining spaces where the at least one light source is fixed, and extending in a first direction;
   a wiring line, which transmits a driving signal to the at least one light source, wherein the wiring line is formed in the light source fixing member such that the wiring line is not directly exposed on the outer surface of the light source fixing member;
   an optical waveguide that guides light emitted from the at least one light source; and
   a fixing member that fixes the light source fixing member and the optical waveguide, wherein the fastening unit of the light source fixing member is fixed to the fixing member,
   wherein the fixing member includes an opening through which a terminal unit is exposed to the outside.

2. The light emitting device of claim 1, wherein the light source fixing member includes the terminal unit that connects the wiring line to an external power supply.

3. The light emitting device of claim 2, wherein the at least one light source is provided as a plurality of light sources, and wherein the terminal unit is disposed adjacent to a leftmost or rightmost light source of the plurality of light sources.

4. The light emitting device of claim 1, wherein the opening of the fixing member is formed proximate a corner of the fixing member.

5. The light emitting device of claim 1, wherein the light source fixing member further includes a printed circuit board in which the wiring line is formed.

6. The light emitting device of claim 5, wherein the printed circuit board is flexible.

7. The light emitting device of claim 1, wherein the fixing member is nonconductive.

8. The light emitting device of claim 1, wherein the light source fixing member and the fixing member are integrally formed.

9. The light emitting device of claim 1, wherein the light source fixing member is coupled to the fixing member in a sliding manner.

10. The light emitting device of claim 1, wherein the fixing member includes an opening, the light source fixing member is disposed in the opening and is fixed to the fixing member, and the difference between the length of the light source fixing member and the width of the opening in the same direction as the longitudinal direction of the light source fixing member is equal to or less than about 0.2 mm.

11. The light emitting device of claim 1, wherein the at least one light source is provided as a plurality of light sources, and the light source fixing member includes a light source fixing portion that fixes the plurality of light sources to be spaced apart from each other at predetermined intervals and extending in the first direction wherein at least one fastening unit of the light source fixing member is connected to a side of the light source fixing portion.

12. The light emitting device of claim 11, wherein the fastening units are formed to have a step shape with the light source fixing portion, and wherein the thickness of the fastening units is smaller than the thickness of the light source fixing portion.

13. The light emitting device of claim 11, wherein grooves are formed in the inner surface of the fixing member, and wherein the fastening units are fitted into the grooves.

14. The light emitting device of claim 11, wherein the thickness of the light source fixing portion is within a range of about 0.3 to about 0.7 mm.

15. The light emitting device of claim 1, wherein a groove is formed in each of the sections, and wherein the plurality of light sources are respectively fixed in the grooves.

16. The light emitting device of claim 1, wherein the side surfaces of each of the sections include a reflective film.

17. The light emitting device of claim 1, wherein the at least one light source is a light emitting diode.

18. A display device comprising a display panel and a light emitting device that supplies light to the display panel, wherein the light emitting device includes:
   at least one light source;
   a rigid, nonconductive light source fixing member having at least one fastening unit and including a plurality of sections defining spaces where the at least one light source is fixed, and extending in a first direction;
   a wiring line, which transmits a driving signal to the at least one light source, wherein the wiring line is formed in the light source fixing member such that the wiring line is not directly exposed on the outer surface of the light source fixing member;
   an optical waveguide that guides light emitted from the at least one light source; and
   a fixing member that fixes the light source fixing member and the optical waveguide wherein the fastening unit of the light source fixing member is fixed to the fixing member,
   wherein the fixing member includes an opening through which a terminal unit is exposes to the outside.

19. A light source unit comprising:

a rigid, nonconductive light source fixing member having at least one fastening unit and including a plurality of sections defining spaces where the at least one light source is fixed, and extending in a first direction;

a wiring line, which transmits a driving signal to the at least one light source, wherein the wiring line is formed in the light source fixing member such that the wiring line is not directly exposed on the outer surface of the light source fixing member; and a fixing member that fixes the light source fixing member and an optical waveguide, wherein the fastening unit of the light source fixing member is fixed to the fixing member, wherein the fixing member includes an opening through which a terminal unit is exposed to the outside.

\* \* \* \* \*